United States Patent

Hanson

[11] 4,227,055
[45] Oct. 7, 1980

[54] MULTIFREQUENCY RECEIVER

[75] Inventor: Robert L. Hanson, Howell Township, Monmouth County, N.J.

[73] Assignee: Bell Telephone Laboratories, Incorporated, Murray Hill, N.J.

[21] Appl. No.: 967,272

[22] Filed: Dec. 7, 1978

[51] Int. Cl.² .............................................. H04M 1/50
[52] U.S. Cl. ................................................ 179/84 VF
[58] Field of Search .................. 179/84 VF; 328/138, 328/139, 140; 307/356, 358

[56] References Cited

U.S. PATENT DOCUMENTS

| | | | |
|---|---|---|---|
| 3,875,347 | 4/1975 | Alaily | 179/84 VF |
| 3,942,038 | 3/1976 | Hutch | 307/235 J |
| 4,091,243 | 5/1978 | Mizrahi et al. | 179/84 VF |
| 4,107,475 | 8/1978 | Carlqvist et al. | 179/84 VF |

*Primary Examiner*—John H. Wolff
*Assistant Examiner*—Joseph A. Popek
*Attorney, Agent, or Firm*—Thomas Stafford

[57] ABSTRACT

Reception of valid two-out-of-N incoming multifrequency signals is realized by employing a multifrequency detector (FIG. 1, 102) including a plurality of filters (FIG. 2, 202-1 through 202-N) and a corresponding plurality of comparators (206-1 through 206-N). The comparators are jointly responsive to output signals from the filters and to a threshold level (RMS REF) dynamically generated (via 204) in response to the incoming signal for generating output pulse signals (103-1 through 103-N) representative of multifrequency tones which exceed the threshold level (RMS REF). The pulse signal outputs (103-1 through 103-N) from the multifrequency detector (102) are evaluated (by 105) to determine whether two and only two tones are present which meet a prescribed criteria. The criteria is that each tone be present for at least a predetermined minimum portion of a prescribed sampling interval and that both tones be present for at least a predetermined number of consecutive sampling intervals. Out-of-band signals are rejected while increasing receiver sensitivity to inband signals by maintaining the peak amplitude of outputs from the filters generated in response to a single tone incoming signal having a frequency midway between the center frequencies of adjacent ones of the filters (202-1 through 202-N) in prescribed relationship to the magnitude of the threshold level (RMS REF) generated in response to the single tone incoming signal (see FIG. 4). In one example, the peak amplitude of the filter outputs is substantially equal to the magnitude of the threshold level (RMS REF, FIG. 4).

12 Claims, 8 Drawing Figures

MULTIFREQUENCY RECEIVER

TECHNICAL FIELD

This invention relates to signaling systems and, more particularly, to multifrequency signaling receivers.

BACKGROUND OF THE INVENTION

Multifrequency signaling is now commonplace in communication systems. It is employed in subscriber signaling, signaling between central offices, intraoffice communications, remote control of other systems, control of remote test equipment, inputting data to computer systems, and the like. Consequently, it is increasingly important that detection of valid multifrequency signals be achieved accurately and inexpensively.

Heretofore, numerous arrangements have been proposed for detecting reception of "valid" multifrequency signals. In prior multifrequency receivers automatic gain control circuits are used to insure the signal supplied to the multifrequency detector is adjusted to a prescribed level. In such arrangements, the automatic gain control circuits are used to insure the signal supplied to the multifrequency detector is adjusted to a prescribed level. In such arrangements, the automatic gain control circuit locks onto the strongest tone in the incoming multifrequency signal and adjusts that tone to a prescribed amplitude level. Consequently, all other tones comprising the incoming signal are adjusted by the same gain and they are not all adjusted to the same amplitude level as the strongest tone. Therefore, to assure confidence in detecting "valid" multifrequency signals and to guard against detecting out-of-band signals, it became the practice to first determine whether one or more tones which exceed a first prescribed amplitude level are present, for example, greater than −5 dB relative to a single tone center of band output from the receiver automatic gain control for the frequency of the particular multifrequency tone and, then, determine whether two and only two tones are present which have a magnitude greater than a second prescribed threshold level, for example, greater than −10 dB relative to the single tone center of band output from the receiver automatic gain control at the frequency of that tone. The −5 dB threshold corresponds to a tone well within the passband of a corresponding filter. The −10 dB threshold corresponds to a tone having 6 dB of twist relative to the other received tone and being at the edge of the filter band for that particular tone. If two and only two tones are present for a prescribed interval they are considered to represent a valid multifrequency command.

Prior multifrequency receiver arrangements tended to approximate the above-stated multifrequency reception objectives. More recently, however, U.S. Pat. No. 4,091,243 issued to A. Mizrahi et al., on May 23, 1978 discloses an arrangement employing a control circuit in conjunction with a controllably adjustable or settable reference threshold level and a plurality of threshold detectors to monitor automatic gain controlled received signal outputs from a plurality of bandpass filters. The reference threshold level supplied to the detectors is controllably adjusted in order to effect the prior telecommunications multifrequency reception objectives stated above. Specifically, upon initialization of the multifrequency receiver, a reference threshold level supplied to the threshold detectors is first set by the control circuit to a first prescribed threshold level, for example, the −5 dB level. Upon detection of at least one tone at one of the desired frequencies having a magnitude which exceeds the first threshold level the control circuit sets the reference threshold level supplied to the detectors to a second prescribed threshold level, for example, the −10 dB threshold level. Thereafter, a routine is effected to determine whether two and only two tones which exceed the −10 dB threshold have been received and have been present for a prescribed interval.

One problem with the prior multifrequency receivers which employ automatic gain control circuits is that tones having magnitudes below the second threshold level of −10 dB are considered invalid. Consequently, tones having greater than 6 dB of twist are rejected and receiver sensitivity is therefore limited. As indicated above, this sensitivity limitation was necessary to guard against erroneous detection of out-of-band signals as valid multifrequency signals. Additionally, the prior arrangements have had to determine whether the tones exceeded first and second threshold levels thereby having to make a determination of tones being present at both these levels. The use of multiple threshold levels is inefficient and also tends to limit sensitivity of the receiver.

SUMMARY OF THE INVENTION

Inefficiency and sensitivity problems, as well as other problems of prior multifrequency receivers, are overcome in a multifrequency receiver of the type including a plurality of bandpass filters and a corresponding plurality of comparator circuits by employing a reference signal generator which responds to an incoming signal for dynamically generating a reference threshold level in prescribed relationship to the incoming signal. The dynamically generated reference threshold level is supplied to the comparators which, in turn, respond to the threshold level in conjunction with output signals from the filters to generate pulse signals representative of tone signals in the incoming signal which exceed the reference threshold level. In turn, the comparator pulse signal outputs are evaluated to determine whether they are present for intervals greater than at least a minimum prescribed portion of a predetermined sampling interval and whether two and only two tones are present for a prescribed interval, i.e., a predetermined number of consecutive sampling intervals. Signals which meet this criteria are considered valid multifrequency commands.

Erroneous detection of incoming signal components having frequencies outside the frequency bands of the plurality of bandpass filters as valid multifrequency tones is effectively eliminated by advantageously maintaining the outputs from the filters in response to an out-of-band signal in a prescribed relationship to the dynamically generated reference threshold level supplied to the comparators. This is realized, in one example, by amplifying the incoming signal supplied to the filters. Consequently, receiver sensitivity is increased. Specifically, the amplifier gain in the input to the plurality of filters is adjusted, in this example, so that an out-of-band single tone at a frequency midway between the center frequencies of adjacent ones of the filters generates an output from the adjacent filters having a peak amplitude in prescribed relationship to the magnitude of the dynamically generated threshold. In one example, the peak amplitude is substantially equal to the magnitude of the dynamically generated threshold level.

BRIEF DESCRIPTION OF THE DRAWING

These and other objects and advantages of the invention will be more fully understood from the following detailed description of an illustrative embodiment thereof taken in connection with the appended drawings, in which.

DETAILED DESCRIPTION

Figure 1:
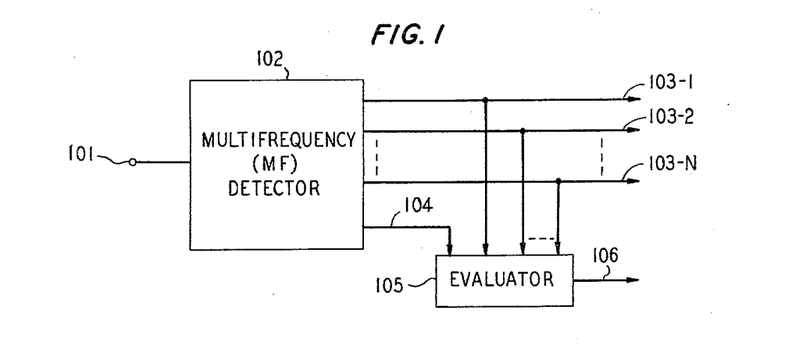
FIG. 1 shows in simplified block diagram form an arrangement in accordance with the invention for detecting reception of multifrequency signals.

FIG. 1 shows in simplified block diagram form a multifrequency receiver including one embodiment of the invention. The multifrequency receiver may be utilized as desired for detecting two-out-of-N multifrequency tones. It is noted that two-out-of-six multifrequency tone receivers have become widely used in telecommunications systems.

Accordingly, received incoming signals are supplied via input terminal 101 to multifrequency (MF) detector 102. It is noted that the incoming signals are usually amplified by some prescribed gain prior to being supplied to the multifrequency receiver. A typical gain value is 20 dB. In prior arrangements the incoming signal was supplied to an automatic gain control circuit. However, in this application, the received incoming signals are not automatic gain controlled and are merely amplified versions of the signals from the communications channel. Multifrequency detector 102 generates at outputs 103-1 through 103-N pulse signal outputs representative of tone signals in the received multifrequency signal and a pulse output at 104 representative that a received signal exceeding a prescribed minimum threshold is present. Outputs 103-1 through 103-N and output 104 are all supplied to evaluator circuit 105 and also may be utilized as desired. Specifically, multifrequency detector 102 responds to the received signal supplied via terminal 101 to generate pulse signal outputs representative of tones having amplitudes which exceed a threshold level dynamically generated in detector 102 in response to the incoming signal. The pulse width of the individual pulse signal outputs is representative of the percent duty cycle that the corresponding tone signal exceeds the dynamically generated reference threshold level.

Evaluator circuit 105 is utilized to determine if any pulse signals developed at outputs 103-1 through 103-N meet a minimum criteria for valid multifrequency tones and then whether two and only two tones are present for at least a minimum prescribed interval. In one example from experimental practice, the output pulses from multifrequency detector 102 should have at least a minimum pulse width of approximately 15 percent of the period of the corresponding incoming tone signal. If two and only two tones meet this minimum criteria for a prescribed interval an indication of a valid multifrequency command having been received is employed either internal to evaluator circuit 105 for any desired purpose, for example, initiating a test sequence or the like, or supplied via output 106 to be employed for any desired purpose, for example, signal a switching system or the like to utilize the received command to effect a switch.

Figure 2:
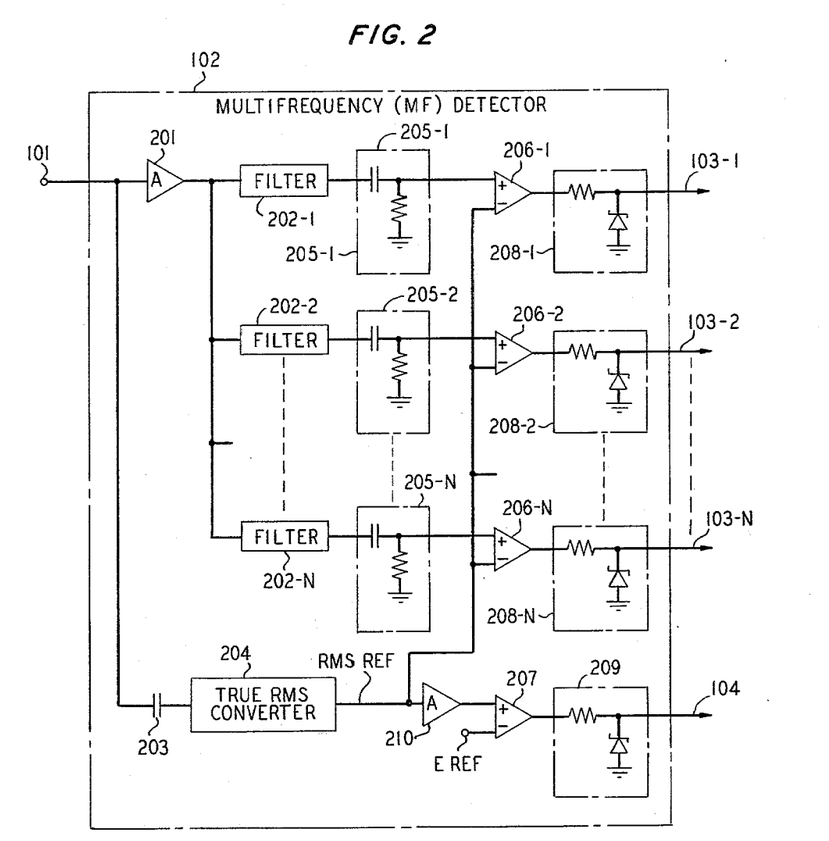
FIG. 2 depicts in simplified form details of the multifrequency detector of the arrangement shown in FIG. 1.

FIG. 2 depicts in simplified form details of multifrequency detector 102 which is one example of a multifrequency detector that may be employed in an embodiment of the invention. In effect, multifrequency detector 102 includes a plurality of frequency sensitive comparator circuits, each responsive to a predetermined tone frequency, and an arrangement for dynamically generating a reference threshold level in response to the incoming signal. Consequently, the need for an automatic gain control circuit is eliminated and circuit sensitivity to incoming signals is increased, as will be apparent to those skilled in the art from the discussion below.

To this end, received incoming signals are supplied from terminal 101 via noninverting amplifier 201 to filters 202-1 through 202-N and via coupling capacitor 203 to true RMS (root mean square) converter 204.

Filters 202-1 through 202-N are bandpass filters each capable of passing a distinct frequency tone employed in telecommunications multifrequency signals, for example, a two-out-of-six multifrequency signaling system. Preferably, they each include two biquadratic active resistor-capacitor filters connected in cascade to realize the bandpass function. An example of one such active filter is generally described in U.S. Pat. No. 3,919,658 issued to J. J. Friend on Nov. 11, 1975. It should be apparent to those skilled in the art that the component values of the filters may be selected to get a desired bandpass characteristic. In one example from experimental practice, the attenuation versus frequency characteristic of the filters is selected so that the crossover point of adjacent filters, i.e., the attenuation at a frequency midway between the center frequencies of adjacent frequency bands, is at least $-11$ dB below a desired reference level, for example $+3$ dB. By employing such a filter characteristic, out-of-band signals, i.e., tone signals that fall approximately midway between adjacent frequency bands, are further attenuated and erroneous detection is substantially minimized.

The individual tone signal outputs from filters 202-1 through 202-N are supplied via corresponding ones of coupling circuits 205-1 through 205-N, respectively, to a first input of a corresponding one of comparator circuits 206-1 through 206-N, respectively. That is to say, outputs from filters 202-1 through 202-N are supplied on a one-to-one basis to inputs of comparator circuits 206-1 through 206-N, respectively.

True RMS converter 204 is a so-called true root mean square (RMS) converter which responds to the incoming signal from terminal 101 to generate a direct current (DC) output approximately representative of the true RMS value of the incoming signal. In one example from experimental practice, an Analog Device RMS converter AD536KD is employed to generate dynamically reference threshold level RMS REF. Use of the true RMS value of the incoming signal is important so that resulting reference threshold level RMS REF is not just determined by the strongest incoming tone. Consequently, greater sensitivity is attained because tone signals having a greater degree of twist relative to the strongest incoming tone or other tones are detectable as valid multifrequency tone signals. Furthermore, a reference threshold level dynamically generated by use of a true RMS converter yields greater sensitivity without increasing the possibility of detecting out-of-band signals. This greater sensitivity is obtained by advantageously employing amplifier 201 having a predetermined gain, as discussed below. Thus, the receiver can detect a valid multifrequency signal out of a wide range of incoming signal levels, for example 30 dB. Reference threshold level RMS REF from converter 204 is supplied to a second input of each of comparator circuits 206-1 through 206-N and via noninverting amplifier 210 to one input of comparator 207. Furthermore, since a true RMS converter is employed to generate threshold level RMS REF, the magnitude of threshold RMS REF increases when more than two tones are present. Consequently, receiver sensitivity is decreased to incoming signals including more than two tones.

Noninverting amplifier 210 is employed to amplify output RMS REF from converter 204 to increase the signal level supplied to a first input of comparator 207. This is necessary to compensate for variations in the level of E REF thereby allowing use of a less precise potential source for E REF. In an example from experimental practice, the gain of amplifier 210 is approximately 37 dB. A direct current reference signal designated E REF is supplied to a second input of comparator 207. In this example, reference signal E REF is a positive DC voltage of approximately 6.2 volts and is representative of an incoming signal −30 dB from a prescribed reference level, for example 0 dB. An output from comparator 207 representative of a signal being present is supplied via output clamp circuit 209 to multifrequency detector output 104. Thus, when RMS REF amplified via amplifier 210 exceeds E REF a high state output is generated at output 104. This output is supplied to evaluator 105 to be employed as described below.

Similarly, outputs from comparators 206-1 through 206-N are supplied via output clamp circuits 208-1 through 208-N, respectively, to multifrequency detector outputs 103-1 through 103-N, respectively. All of output clamp circuits 208-1 through 208-N and 209 are similar. As will be apparent to those skilled in the art, clamp circuits 208-1 through 208-N and 209 generate a desired output pulse level, in this example from experimental practice, approximately −0.5 volts representative of a low state or logical 0, and approximately +5 volts representative of a high state or a logical 1. The logical 1 output is representative of a signal being present. Thus, output pulse signals are generated at outputs 103-1 through 103-N represented by a high state signal when a corresponding inband tone signal which exceeds RMS REF is present at the output of a corresponding one of filters 202-1 through 202-N, and a low state signal is generated when no tone signal is present. An output pulse is generated at output 104 when a signal exceeding a prescribed level is supplied via the telecommunications channel to the receiver.

Figure 3:
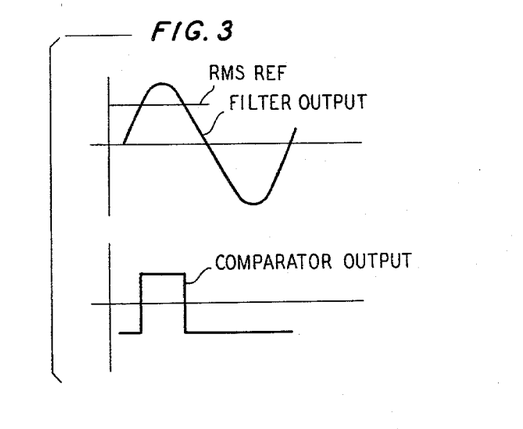
FIG. 3 shows waveforms useful in describing the operation of the multifrequency detector of FIG. 2.
Figure 4:
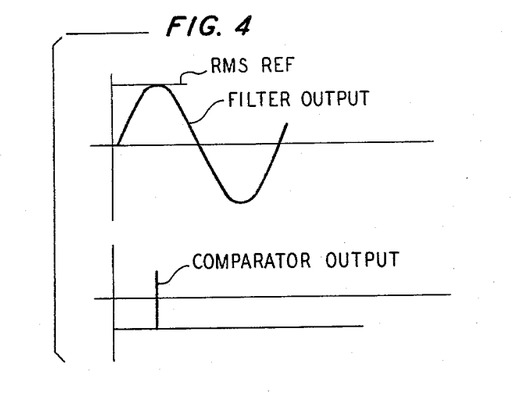
FIG. 4 also depicts waveforms useful in describing operation of the multifrequency detector of FIG. 2.

It is important to note that out-of-band tone signals, i.e., unwanted incoming signal components which occur at frequencies between the frequency bands of filters 202-1 through 202-N are controlled so that they do not generate pulse signal outputs from comparators 206-1 through 206-N, respectively, which meet the minimum requirements for a valid tone signal. Rejection of incoming single or multiple tone signals at frequencies midway between the center frequencies of adjacent ones of filters 202 is especially important since a single tone can generate outputs from both of the adjacent filters. This rejection of out-of-band tones is realized in accordance with one aspect of the invention by the attenuation versus frequency characteristic of the individual filters 202-1 through 202-N coupled with the gain of amplifier 201 being selected in predetermined relationship with the magnitude of dynamically generated reference threshold level RMS REF from true RMS converter 204. As indicated above, the attenuation versus frequency characteristics of each of filters 202 is such that signals at frequencies midway between the center frequencies of adjacent ones of filters 202 are, in this example, attenuated by approximately 11 dB from the center frequencies of the adjacent filters. However, it is important, in addition to rejection of the unwanted out-of-band signals, to increase the receiver sensitivity to inband signals. Sensitivity is increased, in accordance with an aspect of the invention, while decreasing the possibility of detecting an out-of-band signal by advantageously inserting a predetermined gain in the circuit path for supplying the incoming signal to filters 202-1 through 202-N. To this end, the gain of noninverting amplifier 201 is set to a prescribed value relative to the magnitude of dynamically generated reference threshold level RMS REF. Specifically, the gain of amplifier 201 is selected so that a valid center of band tone signal having no twist generates a pulse signal at the output of a corresponding one of comparators 206 having a pulse width, in this example from experimental practice, of approximately 28 percent of the period of the corresponding tone signal as illustrated in FIG. 3 and so that an unwanted out-of-band signal, i.e., a single tone signal midway between adjacent frequency bands, generates a pulse signal having a pulse width, in this example, of approximately 2 percent of the corresponding period, as illustrated in FIG. 4. From experimentation it has been determined that selecting the gain value of amplifier 201 so that the peak amplitude of output signals from adjacent ones of filters 202 in response to a single tone out-of-band signal having a frequency midway between the center frequencies of adjacent ones of filters 202 is substantially equal to the magnitude of dynamically generated threshold RMS REF in response to the single tone signal, results in increased sensitivity to inband signals while still rejecting out-of-band signals. In one example from experimental practice, a gain of 5 dB is satisfactory to meet this objective. It should be noted that a similar result, i.e., maintaining the prescribed relationship between the peak filter outputs and the magnitude of threshold RMS REF in response to a single tone input midway between adjacent frequency bands, is obtained by inserting attenuation into the input to RMS converter 204.

If further assurance of rejecting out-of-band signals is desired the gain value of amplifier 201 can be reduced. To this end, it has been determined that by selecting a minimum acceptable percentage of the corresponding period of the incoming signals to be midway between the 2 percent for an unwanted signal and the 28 percent for a midband signal with no twist is effective to reject unwanted frequency components while increasing the overall sensitivity of the receiver. Thus, a signal having a pulse width which is 15 percent of the corresponding tone signal period is sufficient to define a valid incoming tone signal while rejecting unwanted tone signals. Consequently, signals having more than 6 dB of twist relative to one another are detactable as valid multifrequency signals and receiver sensitivity is increased.

Figure 5:
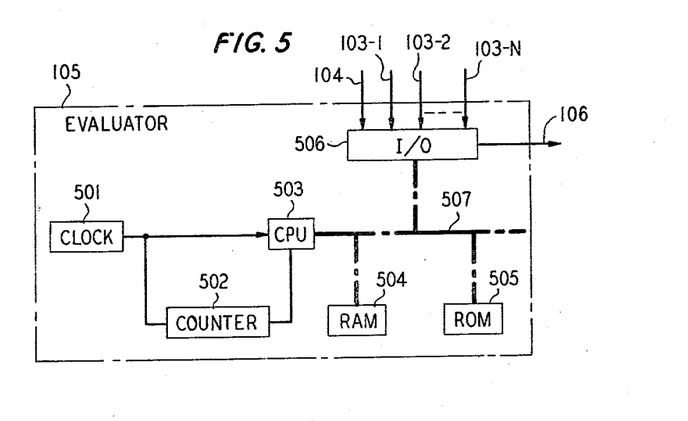
FIG. 5 shows in simplified form details of the evaluator employed in the arrangement depicted in FIG. 1.

FIG. 5 shows in simplified block diagram form details of evaluator circuit 105. Accordingly, shown are clock circuit 501, programmable counter 502, central processor unit (CPU) 503, read-write memory unit, commonly referred to as random access memory (RAM) 504, read only memory (ROM) 505, and input/output unit (I/O) 506. CPU 503, RAM 504, ROM 505, and I/O 506 are interconnected via bus 507 to form a microcomputer system. Clock 501 and counter 502 generate timing signals for CPU 503. Counter 502 is set to a fixed count for effecting a division of the timing signal from clock circuit 501, thereby generating a periodic interrupt signal for CPU 503. The periodic interrupt signal is employed to initiate periodically evaluation cycles. In an example from experimental practice, the frequency of the timing signal generated by clock circuit 501 is 4 megahertz and the division effected by counter 502 is selected to obtain an interrupt evaluation interval of approximately 1.4 milliseconds (msec). The evaluation interval corresponds approximately to the period of the lowest frequency of the incoming multifrequency tones and is of sufficient duration to allow approximately 87 samples to be taken of outputs 103-1 through 103-N and 104 from multifrequency detector 102 (FIG. 1). Thus, in this example, a tone signal must generate a pulse signal output at a corresponding one of outputs 103 and 104 during at least 16 of the 87 samples to be considered a valid tone. Upon detection of a valid multifrequency command, the command information is used either internal to evaluator circuit 105 to initiate some action, for example, a test sequence or the like, or an output is generated at output 106 to be utilized by other apparatus as desired.

Any of several arrangements now commercially available may be employed to realize the desired implementation of evaluator circuit 105. In an example from experimental practice, an Intel 8085 CPU and compatible associated circuit elements have been employed. The 8085 and its operation is described in "MCS 85 Users' Manual", published by Intel, dated March 1977, while programming is described in the "Intel 8080/85 Assembly Language Programming Manual", dated 1977. It is also noted that a CPU unit, RAM memory, ROM memory and an I/O unit are available packaged as a single unit, for example, the Intel 8048 or similar units.

CPU 503 includes a plurality of working registers which are employed in the evaluation process as indicated in the appended listing, namely, registers A, B, C, D, E, H and L. The multifrequency tone evaluation routine to be described below is stored in ROM 505.

Operation of evaluator circuit 105 in evaluating pulse signals developed at outputs 103-1 through 103-N and output 104 from multifrequency detector 102, in accordance with one aspect of the invention, is described in the digital program listing shown in the Appendix. This program listing, written in assembly language for the Intel 8085 microprocessor, is a description of the set of electrical control signals that serve to configure evaluator 105 into a machine capable of evaluating output signals from multifrequency detector 102 to determine, in accordance with an aspect of the invention, whether received input signals supplied via terminal 101 are valid multifrequency commands.

Figures 6, 7:
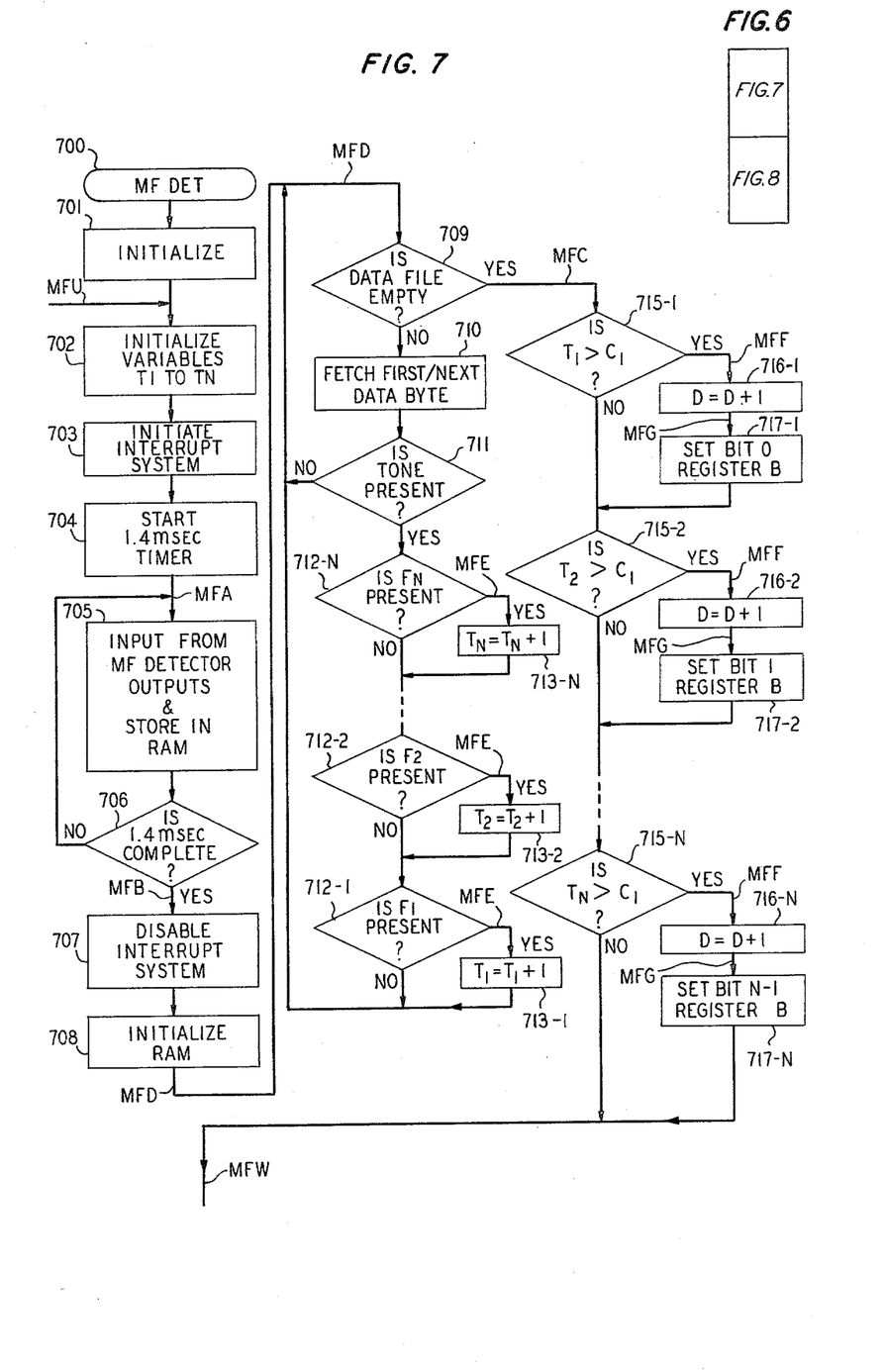
FIGS. 7 and 8, when combined as shown in FIG. 6, are a flowchart which illustrates the sequence of steps employed in one embodiment of the invention for evaluating outputs from the multifrequency detector of FIG. 1 to determine reception of valid multifrequency signals.
Figure 8:
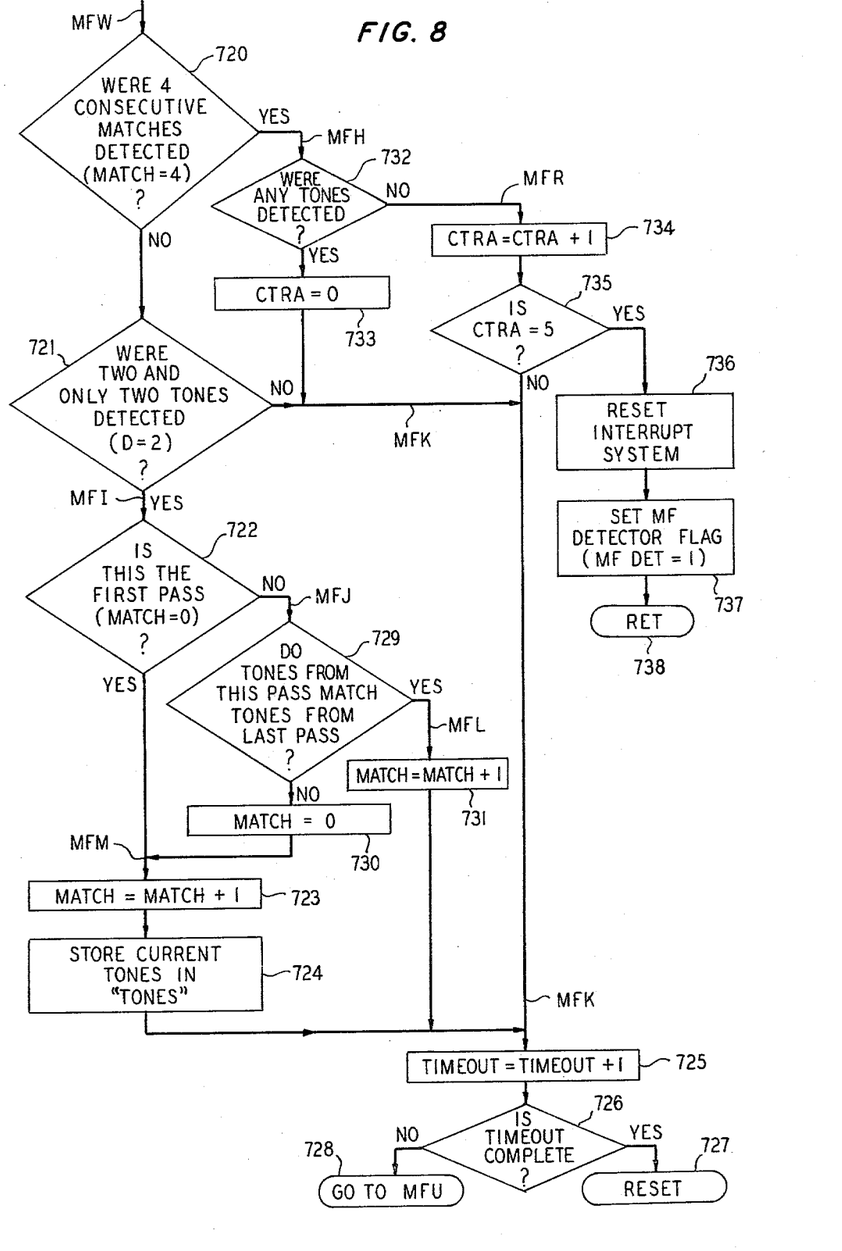

The program listing and, hence, operation of evaluator circuit 105, in accordance with an aspect of the invention, is more readily understood with the aid of the flowchart shown in FIGS. 7 and 8 when connected as depicted in FIG. 6. The flowchart can be seen to include three different symbols. The oval symbols indicate the beginning and end of the routine. The rectangular symbols, commonly referred to as operational blocks, contain the description of a particular detailed operational step. The diamond symbols, commonly referred to as conditional branch points, contain a description of a test performed by the microcomputer for enabling it to determine the next operation to be performed.

As shown in the flowchart of FIGS. 7 and 8, the multifrequency (MF) detection (MF DET) routine is entered at oval 700. Operational block 701 indicates that evaluator 105 is initialized. That is to say, an internal timer is set to 1.4 milliseconds and all other detector variables are initialized, for example, working registers in CPU 503 are cleared. This occurs when the main program of the microcomputer is left to enter the multifrequency detector subroutine.

Operational block 702 indicates that variables Tl through TN are initialized, i.e., set to zero. This program point is labeled MFU.

Operational block 703 indicates that the interrupt system of CPU 503 is initiated.

Operational block 704 indicates that a 1.4 millisecond timer corresponding to the evaluation interval is started.

Operational block 705 indicates sampling of outputs 103-1 through 103-N and 104 from multifrequency detector 102 and storing the samples in RAM 504. Operational block 705 is labeled MFA.

Branch point 706 tests to determine whether the 1.4 millisecond evaluation interval is completed. The NO test result returns control to label MFA and samples of outputs 103-1 through 103-N and 104 from MF detector 102 (FIG. 1) are stored until the 1.4 millisecond evaluation period is completed. Once the 1.4 millisecond interval is completed control is transferred to operational block 707, label MFB.

Operational block 707 disables the interrupt system of CPU 503 while evaluating the samples stored in RAM 504.

Operational block 708 initializes RAM memory 504. Control is transferred to branch point 709, label MFD.

Branch point 709 tests to determine whether the data file in RAM 504 is empty. The YES test result is discussed below. If the data file is not as yet empty, i.e., a NO result, control is transferred to operational block 710.

Operational block 710 causes the first/next data byte to be fetched from RAM 504. Control is transferred to branch point 711.

Branch point 711 tests the data byte to determine if a tone present indication has been received. If no indication of tone being present resides in the data byte control is returned to label MFD and steps 709, 710 and 711 are iterated until tone is either present or the data file is empty. Assuming tone is present, control is transferred to branch point 712-N.

Branch point 712-N tests to determine if frequency FN is present. If frequency FN is present the TN counter in RAM 504 is incremented, label MFE. After incrementing the counter, or a NO test result, control is transferred to the next branch point for testing whether the next frequency is present. This process is iterated through branch points 712-2 and 712-1 until all frequencies have been tested. Control is thereafter returned to label MFD and the frequency detection process is iterated until the data file is empty, i.e., all 87 samples or data bytes in a 1.4 millisecond evaluation interval have been tested.

Returning to branch point 709, i.e., label MFD, a test is made to determine if the data file is empty. A YES test result transfers control to branch point 715-1, label MFC.

Branch point 715-1 tests to determine if the number of samples which contained frequency F1 present, i.e., whether T1 is greater than a predetermined constant C1. As indicated above, for corresponding frequency F1 to be valid it must be present for at least approximately 15 percent of the evaluation interval or for 16 samples of the 87 samples taken during the 1.4 millisecond evaluation interval. If T1 is greater than C1, indicating F1 present, control is transferred to operational block 716-1, labeled MFF, and tone present register D in CPU 503 is incremented. Control is then transferred to operational block 717-1 labeled MFG and bit O of working register B is set thereby indicating frequency F1 is present. Control is thereafter supplied to branch point 715-2. Similarly, if frequency F1 was not present sufficiently long, T1 would be less than C1 and the test result is NO causing control also to be transferred to branch point 715-2. Thereafter, the above process is iterated for each frequency to determine whether tones T2 through TN are present. Thereafter, control is transferred to branch point 720, label MFW.

Branch point 720 tests to determine if four consecutive matches were detected. The YES test is discussed below. Assuming this is the first pass, the test result is NO and control is transferred to branch point 721.

Branch point 721 tests to determine whether two and only two tones were detected. The NO test is discussed below. If two and only two tones were detected control is transferred to branch point 722, label MFI.

Branch point 722 tests to determine if this is the first pass, that is match equals zero. The NO test is discussed below. Since this is the first pass, control is transferred to operational block 723, labeled MFM and a register in CPU 503 assigned to match is incremented. Thereafter, control is transferred to operational block 724.

Operational block 724 causes the detected tones to be stored in a memory location in RAM 504 designated "TONES" for later use. Thereafter, control is transferred to operational block 725, label MFK.

Operational block 725 increments a time-out counter. Thereafter, control is transferred to branch point 726.

Branch point 726 tests to determine if a predetermined time-out period is complete, in one example, 15 seconds. If YES the receiver is reset via 727 and attempting to detect MF commands is terminated. If NO, control is returned to MFU via 728.

Since this was the first pass the above process is iterated for additional evaluation cycles.

Assume that received multifrequency tones are again detected and the above process again proceeds to branch point 722, i.e., two and only two tones are detected. Branch point 722 again tests to determine if this is the first pass, i.e., whether match equals zero. Since this is at least a second pass the test result is NO and control is transferred to branch point 729, label MFJ.

Branch point 729 tests to determine whether tones detected from this pass match the tones detected during the last pass. If the test result is NO control is transferred to operational block 730 and the match register is again set to zero. Thereafter, control is transferred to label MFM and the process continues as described above. If the test result is YES control is transferred to operational block 731, label MFL, and the match register is incremented. Thereafter, control is transferred to label MFK and the process proceeds as described above.

Assume now that four consecutive passes having four consecutive matches have been made and the process again proceeds to branch point 720, i.e., label MFW, which again tests whether four consecutive matches have been detected, i.e., match equals four. The YES test result transfers control to branch point 732, label MFH.

Branch point 732 tests to determine whether any tones are presently detected. This is to determine if the multifrequency command has terminated so that no further action is initiated prior to the termination of the multifrequency command. If tones are still detected the test result is YES and control is transferred to operational block 733 and a count stored in a memory location in RAM 504 designated CTRA counter is set to zero. Thereafter, control is transferred to label MFK and the process proceeds as described above. If no tones are detected control is transferred to operational block 734, label MFR, and the CTRA counter is incremented. Thereafter, control is transferred to branch point 735.

Branch point 735 tests to determine whether the CTRA counter has a count of five indicating that no tones have been detected for five evaluation periods. If the test result is NO control is transferred to label MFK and the process proceeds as described above. If no tones are detected for five evaluation intervals CTRA equals five and control is transferred to operational block 736.

Operational block 736 resets the interrupt system of CPU 503. Thereafter, control is transferred to operational block 737.

Operational block 737 sets the multifrequency detector flag indicating that a multifrequency command has been detected for use internal to CPU 503 or to cause an output to be generated at output 106 of evaluator 105 (FIG. 5). Thereafter, control is returned to the main program of the microcomputer system via 738.

Returning now to branch point 721 which tests whether two and only two tones have been detected and assuming that the test result is NO, control is transferred to label MFK and the process proceeds as described above.

In summary, outputs from multifrequency detector 102 (FIG. 2) are evaluated by evaluator circuit 105 (FIG. 5) to determine whether two and only two tones are present which meet at least the minimum criteria of being present for a prescribed minimum duration during a sampling interval and then being present for a prescribed interval, i.e., at least four consecutive sampling intervals. If these conditions are met the received multifrequency signal is a valid multifrequency command and may be utilized as desired.

The above described arrangements are, of course, merely illustrative of an application of the principles of the invention. Numerous other arrangements may be devised by those skilled in the art without departing from the spirit and scope of the invention. For example, the sampling intervals, the evaluation intervals and the portion of the sampling interval that a tone signal must be present for it to be a valid tone may be altered by those skilled in the art to meet the requirements of particular applications. Indeed, the time-out intervals and the like may be shortened as desired to meet the specific needs of the application.

APPENDIX

```
        ORG    3CH
        INX    SP              ;REMOVE RET ADDRS FROM STACK
        INX    SP
        JMP    JUMP            ;GO TO "VARIABLE JMP" STATEMENT
MFDET:  LXI    H,2800          ;SET TIMER TO 1.4 SEC MSEC
        MOV    A,L
        OUT    34H
        MOV    A,H
        ORI    0C0H
        OUT    35H
        MVI    A,0             ;INIT TONE SOURCE SWITCHING
        OUT    21H
        OUT    22H
        MVI    A,0DBH          ;SET UP PATH FROM T&R TO DETECTOR
                               ;AND OPERATE "LOOP" RELAY
        OUT    32H
        MVI    A,41H
        OUT    20H
        MVI    A,11            ;INIT ALL MF DET VARIABLES
        LXI    H,T7
        CALL   MFN             ;ZERO 12 CONSECUTIVE LOCATIONS
MFU:    LXI    H,MFB           ;SET UP VARIABLE JUMP
        SHLD   ADDRS
        MVI    A,6             ;INIT VARIABLES T7 THROUGH T17
        LXI    H,T7
        CALL   MFN
        CALL   SET75           ;INIT INT SYSTEM
        LXI    H,BUF           ;SET H/L TO ADDRS OF BUF
        MVI    A,0C2H          ;START TIMER
        OUT    30H
        EI
MFA:    IN     31H             ;INPUT DATA AND STORE (LOOP
                               ;TAKES 33 CYCLES OR 16 MICRO SEC)
        MOV    M,A
        INX    H
        JMP    MFA
```

```
MFB:    DI                  ;DISABLE INTERRUPT
        CALL    SET75       ;CLEAR THE COUNTER AND INTERRUPT
                            ;SYSTEM
        LXI     B,BUF       ;SET B/C TO ADDRS OF BUF
MFD:    LXI     D,T17       ;SET D/E TO ADDRS OF T1700
        MOV     A,C         ;IS BUFFER EMPTY
        CMP     L
        JZ      MFC         ;YES
        MOV     A,M         ;NO,FETCH FIRST/NEXT BYTE
        DCX     H           ;H,L POINT TO NEXT BYTE IN
                            ;BUFFER TO BE LOOKED AT
        RAL                 ;IS TONE PRESENT
        RAL
        JNC     MFD         ;NO
        RAL                 ;YES,IS 1700 HZ PRESENT
        CC      MFE         ;YES,INCREMENT T17
        RAL                 ;NO,IS 1500 HZ PRESENT
        DCX     D
        CC      MFE         ;YES,INCREMENT T15
        RAL                 ;NO,IS 1300 HZ PRESENT
        DCX     D
        CC      MFE         ;YES, INCREMENT T13
        RAL                 ;NO,IS 1100HZ PRESENT
        DCX     D
        CC      MFE         ;YES, INCREMENT T11
        RAL                 ;NO,IS 900 HZ PRESENT
        DCX     D
        CC      MFE         ;YES,INCREMENT T9
        RAL                 ;NO,IS 700 HZ PRESENT
        DCX     D
        CC      MFE         ;YES, INCREMENT T7
        JMP     MFD         ;NO,CONVERT NEXT BYTE

MFC:    MVI     B,1H        ;B WILL CONTAIN BIT FOR MF TONE
                            ;BEING TESTED
        MVI     C,0H        ;C WILL END UP WITH BITS FOR
                            ;MF TONES PRESENT
        MVI     D,0H        ;D WILL END UP WITH A COUNT
                            ;INDICATING THE NUMBER OF
                            ;DUTY CYCLE TIMES SAMPLES
```

```
LXI     H,T7        ;IS T7 GREATER THAN NUM26
MOV     A,M
CPI     C1
CNC     MFF         ;YES, OR C WITH 1H <IN REG B> AND
                    ;INCREMENT D
CALL    MFG         ;ZERO T7, ROTATE B 1 LEFT, AND
                    ;LOAD A WITH T9
CPI     C1          ;NO,IS T9 > NUM26?
CNC     MFF         ;YES, OR C WITH 2H <IN B REG> AND
                    ;INCREMENT D
CALL    MFG         ;ZERO T9, ROTATE B 1 LEFT AND
                    ;LOAD A WITH T11
CPI     C1          ;NO,IS T11 > NUM26?
CNC     MFF         ;YES, OR C WITH 4H <IN B REG>
                    ;AND INCREMENT D
CALL    MFG         ;ZERO T11, ROTATE B 1 LEFT, AND
                    ;LOAD A WITH T13
CPI     C1          ;NO,IS T13 > NUM26?
CNC     MFF         ;YES, OR C WITH 8H <IN REG B> AND
                    ;INCREMENT D
CALL    MFG         ;ZERO T13,ROTATE B 1 LEFT, AND
                    ;LOAD A WITH T15
CPI     C1          ;NO,IS T15 > NUM26?
CNC     MFF         ;YES, OR C WITH 10H <IN REG B> AND
                    ;INCREMENT D
CALL    MFG         ;ZERO T15, ROTATE B 1 LEFT, AND
                    ;LOAD A WITH T17
CPI     C1          ;NO,IS T17 > NUM26?
CNC     MFF         ;YES,OR C WITH 20H <IN REG B> AND
                    ;INCREMENT D
CALL    MFG         ;ZERO T17
LXI     H,MATCH     ;H,L POINT TO RAM LOCATION MATCH
MOV     A,M         ;A HAS CONTENTS OF MATCH
CPI     4           ;WERE 4 CONSECUTIVE MATCHES
                    ;DETECTED
JZ      MFH         ;YES
MOV     A,D         ;NO, A HAS CONTENTS OF D REGISTER
CPI     2           ;WERE THERE TWO AND ONLY TWO TONES
                    ;DETECTED?
JZ      MFI         ;YES
```

```
MFK:    LHLD    TOUT        ;NO, INC TIMEOUT TIMER (TOUT)
        INX     H
        SHLD    TOUT
        MOV     A,H
        CPI     13          ;15 SEC
        JNZ     MFU         ;NO, TRY AGAIN
        JMP     RESET       ;YES
MFI:    MOV     A,M         ;IS THIS THE FIRST PASS (MATCH=0)
        CPI     0
        JNZ     MFJ         ;NO
MFM:    INR     M           ;YES, MATCH=MATCH+1
        LXI     H,TONES     ;SAVE THE TONES
        MOV     M,C
        JMP     MFK
MFJ:    MOV     A,C         ;DO TONES FROM THIS PASS MATCH
                            ;TONES FROM LAST PASS
        LXI     H,TONES
        CMP     M
        JZ      MFL         ;YES
        LXI     H,MATCH     ;NO, RESET "MATCH"
        MVI     M,0H
        JMP     MFM
MFL:    LXI     H,MATCH     ;INCREMENT "MATCH"
        INR     M
        JMP     MFK
MFH:    MOV     A,D         ;WERE ANY TONES DETECTED
        CPI     0
        JZ      MFR         ;NO
        XRA     A           ;YES, RESET CTRA
        STA     CTRA
        JMP     MFK         ;TRY AGAIN
MFR:    LXI     H,CTRA      ;INCREMENT CTRA
        INR     M
        MOV     A,M         ;IS TONE ABSENT FOR 5 TRIES
        CPI     5
        JNZ     MFK         ;NO
        CALL    SET75       ;YES, RESET INT SYS
        LXI     H,MFRCV     ;SET MF DETECTED FLAG
        MVI     M,1
        RET
```

```
MFE:    XCHG                ;EXCHANGE HL WITH DE
        INR     M
        XCHG
        RET

MFF:    MOV     A,C         ;UPDATA TONE PRESENT REGISTER
        ORA     B
        MOV     C,A
        INR     D           ;INC TONE COUNTER
        RET

MFG:    MVI     M,0         ;INITIALIZE TONE CTR (T7-T17)
        MOV     A,B         ;UPDATA TONE PLACE CTR
        RLC
        MOV     B,A
        INX     H           ;FETCH NEXT TONE
        MOV     A,M
        RET

MFN:    MVI     M,0H
        INX     H
        DCR     A
        CPI     0
        JNZ     MFR
        RET
        ORG     3000H
JUMP    DB      0C3H        ;VARIABLE JUMP STATEMENT
ADDRS   DS      2
T7      DS      1           ;MF DET ROUTINE
T9      DS      1
T11     DS      1
T13     DS      1
T15     DS      1
T17     DS      1
TONES   DS      1
TOUT    DS      2
MATCH   DS      1
CTRA    DS      1           ;MF DET VARIABLES
MFRCV   DS      1
        END     0
```

I claim:

1. Apparatus (FIG. 1) supplied with an incoming received signal (via 101) for detecting reception of multifrequency signals of the type including a plurality of filters (FIG. 2, 202-1 through 202-N) for passing individual multifrequency tones and a plurality of comparators (FIG. 2, 206-1 through 206-N) connected on a one-to-one basis with the plurality of filters (202-1 through 202-N) for generating pulse signal outputs (at 103-1 through 103-N) representative of individual multifrequency tones which exceed a reference threshold level supplied to the comparators, CHARACTERIZED BY, means (FIG. 2, 204) responsive to the incoming signal for dynamically generating a reference threshold level (RMS REF) having a value in prescribed relationship to the input signal (from 101), said reference threshold level being supplied to the plurality of comparators (206-1 through 206-N), and means (FIG. 1, 105) supplied with the output pulse signals (103-1 through 103-N) from the plurality of comparators (FIG. 2, 206-1 through 206-N) for evaluating the interval each of the comparator output pulse signals is present during a predetermined sampling interval to determine whether corresponding valid multifrequency tones have been received.

2. The apparatus as defined in claim 1 wherein said reference threshold level (RMS REF) value is proportional to the true root mean square (RMS) value of the incoming signal (supplied via 101).

3. Apparatus as defined in claim 1 further including means (FIG. 2, 201) for maintaining the magnitude of said dynamically generated threshold level (RMS REF) and the peak amplitude of output signals from the filters (202-1 through 202-N) in response to a single tone incoming signal having a frequency substantially midway between center frequencies of adjacent ones of the filters (202-1 through 202-N) in a prescribed relationship.

4. Apparatus as defined in claim 3 wherein said means for maintaining includes amplifier means (201) in circuit with inputs to the plurality of filters (202-1 through 202-N) having a prescribed gain for maintaining the filter outputs in response to said single tone input in said prescribed relationship with the magnitude of said threshold level (RMS REF).

5. Apparatus as defined in claim 4 wherein said gain of said amplifying means (201) is set to a value so that the peak amplitude of the outputs from said adjacent ones of the filters (202-1 through 202-N) in response to said single tone incoming signal is substantially equal (FIG. 4) to the magnitude of said threshold level (RMS REF).

6. Apparatus as defined in claim 1 wherein said means for evaluating (105) further evaluates the pulse signal outputs from the plurality of comparators (206-1 through 206-N) to determine if the individual pulse signal outputs (at 103-1 through 103-N) are present for at least a predetermined minimum percentage of the sampling interval.

7. Apparatus as defined in claim 6 wherein said means for evaluating (105) further evaluates the output pulse signals (at 103-1 through 103-N) from the plurality of comparators (206-1 through 206-N) to determine if the output pulse signals are present for at least a predetermined number of consecutive sampling intervals and that two and only two comparator output pulse signals are present during the consecutive sampling intervals.

8. Apparatus as defined in claim 7 further including means (207, 210 E REF) for detecting the presence of an incoming signal and wherein said evaluator means (105) employs the output (104) from said signal presence detecting means (207, 210, E REF) to determine whether tone signals are present and to determine the termination of the tone signals.

9. Apparatus as defined in claim 6 wherein said evaluator means (105) includes computer means (105).

10. Apparatus as defined in claim 9 wherein said computer means (105) includes central processor unit means (CPU 503) having a plurality of working registers, clock means (501) for supplying a first timing signal at a first frequency to the central processor means (503), digital divider means (counter 502) supplied with the first timing signal for generating a second timing signal at a second frequency which is supplied to an interrupt input of the central processor means (503), read-write memory means (RAM 504) read only memory means (ROM 505), and input/output means (I/O 506).

11. Apparatus as defined in claim 10 wherein said second timing signal has a period substantially equal to the period of the lowest frequency tone intended to be received and corresponds to the sampling interval.

12. Apparatus as defined in claim 1 wherein a set of instructions are stored in the read-only memory (ROM 505) for controlling the evaluator means (105) to effect detection of valid multifrequency tones by sampling the comparator outputs (103-1 through 103-N) for the prescribed sampling interval (for example, 1.4 milliseconds), determining the tone signals (F1 through FN) which are present during the prescribed sampling interval for at least a predetermined minimum portion (for example 16 samples) of the prescribed sampling interval, determining whether two and only two tones are present, and determining whether the two and only two tones are detected as being present for at least a prescribed interval represented by a predetermined number of consecutive sampling intervals.

* * * * *

UNITED STATES PATENT AND TRADEMARK OFFICE
CERTIFICATE OF CORRECTION

PATENT NO. : 4,227,055
DATED : October 7, 1980
INVENTOR(S) : Robert L. Hanson

It is certified that error appears in the above-identified patent and that said Letters Patent are hereby corrected as shown below:

Column 22, line 40, "claim 1" should read --claim 11--.

Signed and Sealed this

Nineteenth Day of January 1982

[SEAL]

Attest:

GERALD J. MOSSINGHOFF

Attesting Officer     Commissioner of Patents and Trademarks